(12) United States Patent
Leonard et al.

(10) Patent No.: US 8,764,855 B2
(45) Date of Patent: Jul. 1, 2014

(54) PROCESS FOR PRODUCING A BIOFUEL WHILE MINIMIZING FOSSIL FUEL DERIVED CARBON DIOXIDE EMISSIONS

(75) Inventors: Laura E. Leonard, Western Springs, IL (US); Gavin P. Towler, Inverness, IL (US); Tom N. Kalnes, LaGrange, IL (US)

(73) Assignee: UOP LLC, Des Plaines, IL (US)

( * ) Notice: Subject to any disclaimer, the term of this patent is extended or adjusted under 35 U.S.C. 154(b) by 520 days.

(21) Appl. No.: 12/969,568

(22) Filed: Dec. 15, 2010

(65) Prior Publication Data

US 2012/0151825 A1    Jun. 21, 2012

(51) Int. Cl.
*C10L 1/18*    (2006.01)
*C10L 1/02*    (2006.01)
*C10L 1/19*    (2006.01)
*C11C 3/00*    (2006.01)

(52) U.S. Cl.
CPC ............. *C10L 1/026* (2013.01); *Y02E 50/13* (2013.01); *C10L 1/19* (2013.01); *C11C 3/003* (2013.01); *C10L 2200/0476* (2013.01)
USPC .................. 44/307; 44/445; 44/451

(58) Field of Classification Search
USPC .......................... 44/307, 451, 445
See application file for complete search history.

(56) References Cited

U.S. PATENT DOCUMENTS

| | | | |
|---|---|---|---|
| 5,792,340 A | 8/1998 | Freel et al. | |
| 6,767,530 B2 | 7/2004 | Kobayashi et al. | |
| 6,964,758 B2 * | 11/2005 | Cortright et al. | 423/648.1 |
| 7,399,341 B2 | 7/2008 | Patel et al. | |
| 2007/0049648 A1 | 3/2007 | Shessel | |
| 2009/0005614 A1 | 1/2009 | Hulteberg et al. | |
| 2009/0069610 A1 * | 3/2009 | Roberts et al. | 585/24 |
| 2009/0127512 A1 | 5/2009 | Basini et al. | |
| 2009/0158637 A1 | 6/2009 | McCall et al. | |
| 2009/0162264 A1 | 6/2009 | McCall et al. | |
| 2009/0229174 A1 | 9/2009 | Brady et al. | |
| 2009/0239279 A1 | 9/2009 | Hall et al. | |

(Continued)

FOREIGN PATENT DOCUMENTS

| | | |
|---|---|---|
| WO | 2009059936 A2 | 5/2009 |
| WO | 2009129622 A1 | 10/2009 |
| WO | 2009152873 A1 | 12/2009 |
| WO | 2010033789 A2 | 3/2010 |

OTHER PUBLICATIONS

Adhikari et al., "Hydrogen Production from Glycerin by Steam Reforming over Nickel Catalysts", Renewable Energy, 2008, vol. 33, pp. 1097-1100.

(Continued)

*Primary Examiner* — Prem C Singh
*Assistant Examiner* — Latosha Hines
(74) *Attorney, Agent, or Firm* — Maryann Maas

(57) ABSTRACT

One exemplary embodiment can be a process for producing a biofuel while minimizing fossil fuel derived carbon dioxide emissions. The process can include providing a renewable feed to an ester degradation zone to produce a first stream including one or more alcohols and a second stream including one or more acids, providing the first stream to a treatment zone for removing one or more salts and to obtain a treated stream, providing the treated stream to a reforming zone to obtain an effluent including hydrogen, and providing the second stream and at least a portion of the effluent to a refining zone for producing the biofuel.

14 Claims, 2 Drawing Sheets

(56) References Cited

U.S. PATENT DOCUMENTS

| | | |
|---|---|---|
| 2009/0259082 A1 | 10/2009 | Deluga et al. |
| 2009/0287029 A1* | 11/2009 | Anumakonda et al. ......... 585/16 |
| 2009/0294324 A1 | 12/2009 | Brandvold et al. |
| 2009/0301930 A1 | 12/2009 | Brandvold et al. |
| 2010/0058648 A1 | 3/2010 | Marker et al. |
| 2010/0076238 A1 | 3/2010 | Brandvold et al. |
| 2010/0140136 A1 | 6/2010 | Spilker et al. |
| 2010/0196242 A1 | 8/2010 | Stanic et al. |

OTHER PUBLICATIONS

Aresta et al., "Energy from Aquatic Biomass: An Integrated Approach to Biodiesel and Hydrogen Production", DGMK Tagungsbericht, 2008, No. 3, pp. 101-108.

Buffoni et al., "Nickel Catalysts Applied in Steam Reforming of Glycerol for Hydrogen Production", Catalysis Communications, 2009, Volume Refer: CATCOM 2098, p. 18 pages.

Burch, "Manufacturing Sustainable Hydrogen for Refinery Processes by Catalytic Conversion of Pyrolysis Oil from Biomass", King Fahd Univ. Petroleum and Minerals Research Inst.—Annual Catalysts in Petroleum Refining & Petrochem. Symposium Papers, Nov. 2009, p. 62.

Byrd et al., "Hydrogen Production from Glycerol by Reforming in Supercritical Water over Ru/Al2O3 Catalyst", Fuel, 2008, vol. 87, pp. 2956-2960.

Chen et al., "Novel Nickel-Based Catalyst for Low Temperature Hydrogen Production from Methane Steam Reforming in Membrane Reformer", Asia-Pacific Journal of Chemical Engineering, Jan.-Feb. 2010, vol. 5, No. 1, pp. 93-100.

Courson et al., "Development of Ni Catalysts for Gas Production from Biomass Gasification. Reactivity in Steam-and Dry-Reforming", Catalysis Today, Dec. 2000, vol. 63, No. 2/4, pp. 427-437.

Cui et al., "Steam Reforming of Glycerol: The Experimental Act. of La1-xCexNiO3 Catalyst in Comparison to Thermodynamic Reactn Equil.", Applied Catalysis B: Environmental, 2009, p. 9 pages.

Diesel Fuel News, "Intelligence on Technology, Compliance and Refining Process . . . Worldwide", May 11, 2009, vol. 13, No. 10, Publisher: Hart, p. 30.

Dou et al., "Hydrogen Production by Sorption-Enhanced Steam Reforming of Glycerol", Bioresource Technology, Mar. 2009, vol. 100, pp. 3540-3547.

Evans et al., "Renewable Hydrogen Production by Catalytic Steam Reforming of Peanut Shells Pyrolysis Products", American Chemical Society, Division Fuel Chemistry, Preprints, Fall 2003, vol. 48, No. 2, pp. 594-595.

Hulteberg et al., "A Study of Combined Biomass Gasification and Electrolysis for Hydrogen Production", International Journal of Hydrogen Energy, Jan. 2009, vol. 34, No. 2, pp. 772-782.

Kalnes et al., "Envergent Biofuel Technology and Life Cycle Assessment", Envergent Technologies Power Point Presentation for 2009 International Conference TC Biomass Conversion Science, Sep. 2009, p. 24 Pages.

Kunkes et al., "An Integrated Catalytic Approach for Production of Hydrogen by Glycerol Reforming Coupled with Water-Gas-Shift", Applied Catalysis B: Environmental, 2009, Volume Refer. APCATB 10703, p. 29 pages.

Levin et al., "Challenges for Renewable Hydrogen Production from Biomass", International Journal of Hydrogen Energy, May 2010, vol. 35, No. 10, pp. 4962-4969.

Marker et al., "Integrated Hydropyrolysis and Hydroconversion Process for Production of Gasoline and Diesel Fuel from Biomass", Conference Proceedings—2009 AlChE Annual Meeting, 09AlChE, Nov. 2009, p. 11 Pages.

Slinn et al., "Steam Reforming of Biodiesel By-Product to Make Reweable Hydrogen", Bioresource Technology, Sep. 2008, vol. 99, No. 13, pp. 5851-5858.

Swami et al., "Integrated Catalytic Process for Conversion of Biomass to Hydrogen", Energy & Fuels, 2006, vol. 20, No. 6, pp. 2616-2622.

Swami et al., "Production of Hydrogen from Glucose as a Biomass Simulant: Integrated Biological and Thermochemical Approach", Industrial Engineering Chemical Research, 2008, vol. 47, No. 10, Abstract Page and pp. 3645-3651.

"TCBiomass2009 The International Conference on Thermochemical Conversion Science", Conference Brochure for TCBiomass Sep. 16-18, 2009, 2009, p. 8 Pages.

Davda et al., "A Review of Catalytic Issues and Process Conditions for Renewable Hydrogen and Alkanes by Aqueous-Phase Reforming of Oxygenated Hydrocarbons Over Supported Metal Catalysts", Applied Catalysis B: Environmental, 2005, vol. 56, pp. 171-186.

Shabaker et al., "Aqueous-Phase Reforming of Oxygenated Hydrocarbons Over Sn-Modified Ni Catalysts", Journal of Catalysis, 2004, vol. 222, pp. 180-191.

Simonetti et al., "Gas-Phase Conversion of Glycerol to Synthesis Gas Over Carbon-Supported Platinum and Platinum—Rhenium Catalysts", Journal of Catalysis, 2007, vol. 247, pp. 298-306.

* cited by examiner

PROCESS FOR PRODUCING A BIOFUEL WHILE MINIMIZING FOSSIL FUEL DERIVED CARBON DIOXIDE EMISSIONS

FIELD OF THE INVENTION

This invention generally relates to a process for producing a biofuel while minimizing fossil fuel derived carbon dioxide emissions.

DESCRIPTION OF THE RELATED ART

There has been an effort to meet regulatory requirements associated with increased renewable fuel production. Processes for producing biofuels such as biodiesel and renewable diesel are currently being developed to replace petroleum derived diesel with lower carbon footprint alternatives. In the United States, a biofuel having the appropriate volatility and cetane characteristics can only be classified as "biomass based diesel" if it typically has a life cycle greenhouse gas reduction of greater than about 50% as compared to the petroleum fuel that it is replacing. In some processes, catalyst and/or heat are utilized to crack renewable oils into less viscous liquid fuels. In other biomass-based diesel processes, vegetable oil can undergo a trans-esterification reaction with methanol to form a fatty acid methyl ester and glycerol. Alternatively, biogenic fats and oils can be catalytically hydroprocessed to produce a fully deoxygenated renewable diesel containing long chain alkanes. However, this type of hydroprocessing is usually accompanied by a significant chemical hydrogen consumption and unless the hydrogen can be obtained from a non-fossil fuel derived source, the carbon footprint of the resulting renewable diesel may exceed regulatory requirements. As a consequence, there is a desire to produce a renewable diesel with a minimal carbon footprint.

SUMMARY OF THE INVENTION

One exemplary embodiment can be a process for producing a biofuel while minimizing fossil fuel derived carbon dioxide emissions. The process can include providing a renewable feed to an ester degradation zone to produce a first stream including one or more alcohols and a second stream including one or more acids, providing the first stream to a treatment zone for removing one or more salts and to obtain a treated stream, providing the treated stream to a reforming zone to obtain an effluent including hydrogen, and providing the second stream and at least a portion of the effluent to a refining zone for producing the biofuel.

Another exemplary embodiment may be a process for producing a biofuel while minimizing fossil fuel derived carbon dioxide emissions. The process may include providing a first stream having one or more alcohols to a treatment zone for removing one or more salts and providing a treated stream having the one or more alcohols, providing the treated stream to a reforming zone providing an effluent including hydrogen, and providing at least a portion of the effluent to a refining zone.

A further exemplary embodiment can be a process for producing a biofuel while minimizing fossil fuel derived carbon dioxide emissions. The process may include providing a renewable feed having a plant-derived oil to a hydrolysis zone to produce a first stream including glycerol and a second stream including one or more fatty acids, providing the first stream to a treatment zone to produce a treated stream, providing the treated stream to a reforming zone providing an effluent, providing the effluent to a separation zone to obtain a purified hydrogen stream, and providing the second stream and the purified hydrogen stream to a refining zone including a hydrodeoxygenation zone and an isomerization zone for producing the biofuel.

The embodiments disclosed herein can provide an oil-splitting process for reducing a plant-derived oil into one or more fatty acids and glycerol. Separating out the glycerol from the fatty acids can minimize the hydrogen consumption in a subsequent hydrodeoxygenating process. In addition, the glycerol can be reformed to provide valuable products as well as hydrogen that can be utilized in the refining process. As a result, the production of hydrogen from petroleum-derived sources can be minimized, lowering the carbon footprint of any resulting biofuel.

DEFINITIONS

As used herein, the term "stream" can include various hydrocarbon molecules, such as straight-chain, branched, or cyclic alkanes, alkenes, alkadienes, and alkynes, and other substances, such as gases, e.g., hydrogen, carbon oxides, or other inorganic impurities, such as alkali metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As depicted, process flow lines in the figures can be referred to interchangeably as, e.g., lines, pipes, feeds, products, effluents, portions, parts, or streams.

As used herein, the terms "absorbent" and "absorber" include, respectively, an adsorbent and an adsorber, and relates, but is not limited to, absorption, and/or adsorption. Likewise, the terms "adsorbent" and "adsorber" include, respectively, an absorbent and an absorber, and relates, but is not limited to, adsorption, and/or absorption.

As used herein, the term "vapor" can mean a gas or a dispersion that may include or consist of one or more hydrocarbons and/or water.

As used herein, the term "overhead stream" can mean a stream withdrawn at or near a top of a column, typically a flash drum or a distillation column.

As used herein, the term "bottom stream" can mean a stream withdrawn at or near a bottom of a column, typically a flash drum or a distillation column.

As used herein, the terms "alkane" and "paraffin" may be used interchangeably.

As used herein, the terms "alkene" and "olefin" may be used interchangeably.

As used herein, the term "biofuel" may be any fuel at least partially derived from sources other than a fossil fuel. A biofuel can include a biodiesel, a renewable diesel, a renewable jet fuel, and a renewable naphtha, and having a distillation range as defined by, e.g., ASTM Test Method D86 or D2887.

As used herein, the term "renewable diesel" can be a fully deoxygenated hydrocarbon-based diesel fuel derived by hydroprocessing renewable feedstock in one or more stages and can have a boiling point range of about 120-about 380° C., preferably about 150-about 350° C. as determined by ASTM Test Method D86 or D2887.

As used herein, the term "renewable jet fuel" can be a fully deoxygenated hydrocarbon-based jet fuel derived by hydroprocessing renewable feedstock in one or more stages and can have a boiling point range of about 120-about 310° C., preferably about 150-about 280° C. as determined by ASTM Test Method D86 or D2887.

As used herein, the term "renewable naphtha" can be a fully deoxygenated hydrocarbon-based naphtha fuel derived by hydroprocessing renewable feedstock in one or more stages and can have a boiling point range of about 20-about 180° C., preferably about 50-about 150° C. as determined by ASTM Test Method D86 or D2887.

As used herein, the term "fossil fuel" can mean any fuel derived in past geologic ages and considered as sequestered carbon in the earth. Exemplary fossil fuels may include petroleum, natural gas, coal, and lignite.

DETAILED DESCRIPTION

Figure 1:
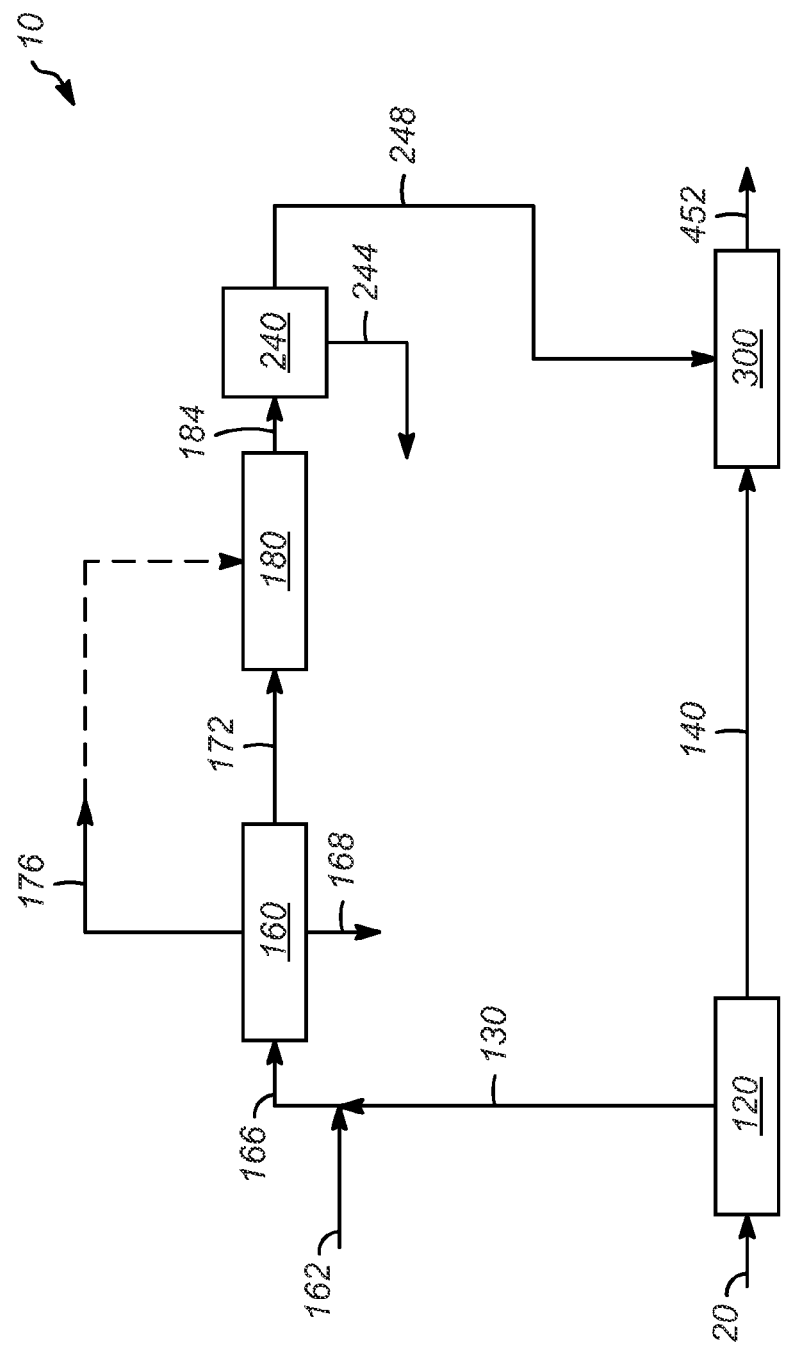
FIG. 1 is a schematic depiction of an exemplary biofuel production facility.

Referring to FIG. 1, a biofuel production facility 10 may include an ester degradation zone 120, a treatment zone 160, a reforming zone 180, a separation zone 240, and a refining zone 300. Generally, the biofuel production facility 10 can receive a renewable feed 20.

Any suitable renewable feed 20 may be used, and can include glycerides, fatty acid alkyl esters (may be abbreviated as "FAAEs"), and free fatty acids (may be abbreviated as "FFAs"). Examples of such feeds may include canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm kernel oil, crambe oil, fatty acid methyl esters, and lard. The glycerides, FAAEs and FFAs of the typical vegetable or animal fat may contain aliphatic hydrocarbon chains in their structure that can have about 8-about 24 carbon atoms with many of the oils containing high concentrations of fatty acids with 16-18 carbon atoms. Mixtures or co-feeds of renewable feedstocks and petroleum derived hydrocarbons may also be used. Other feed components, which may be used in combination, can include spent motor oils and industrial lubricants, used paraffin waxes, liquids derived from gasification of coal, biomass, or natural gas followed by a downstream liquefaction step such as Fischer-Tropsch technology; liquids derived from depolymerization of waste plastics such as polypropylene, high density polyethylene, and low density polyethylene; and other synthetic oils generated as byproducts from petrochemical and chemical processes. Any suitable mixture of the above may be incorporated into a feed. Exemplary feeds are disclosed in, e.g., US 2009/0287029 A1.

In one exemplary embodiment, the renewable feed 20 can include a nonpetroleum based oil, such as a plant-derived oil or an animal-derived oil to minimize fossil fuel derived carbon dioxide emissions. The plant-derived oil can be derived from seeds, nuts, linseed, tung, oiticica, soybean, cottonseed, castor, coconut, palm, and/or coconut, and can include an essential oil. The essential oil can include complex volatile liquids derived from flowers, stems, and leaves, and often an entire plant. An essential oil may include terpenes, such as pinene and dipentene. The animal oil can occur as fats, and may include liquid oils such as fish oils, fish liver oils, oleic acid, or sperm oil. These oils can have varying degrees of saturation and be utilized in any suitable combination. Preferably, the renewable feed 20 includes a plant-derived oil.

The renewable feed 20 can be provided to an ester degradation zone 120. Typically, the ester degradation zone 120 includes a hydrolysis zone that can break the plant-derived oils into one or more alcohols and one or more acids, typically fatty acids. An exemplary hydrolysis unit is disclosed in, e.g., US 2009/0069610 A1.

Generally, the hydrolysis can be carried out at a temperature of about 220-about 300° C. and a pressure of about 0.5-about 20 MPa. In one exemplary embodiment, a continuous, high-pressure, uncatalyzed countercurrent splitting process can employ a reaction tower or column with continuous removal of liberated glycerol with a water stream. Generally, the conditions include a residence time in the reactor of about 1-about 4 hours and a temperature of about 240-about 260° C. In another embodiment, a hydrolysis process may be a quasi-batch at a temperature of about 270-about 290° C., a reaction time of less than about 1 hour, and a water-to-oil volume ratio of about 3:1-about 1.5:1 v/v.

Generally, the ester degradation zone 120 can provide a first stream 130 including one or more alcohols, such as glycerol, and a second stream 140 including one or more acids, such as fatty acids. The first stream 130 can be combined with a make-up glycerol stream 162 and a combined glycerol stream 166 can be provided to a treatment zone 160. In one exemplary embodiment, the first stream 130 can include at least about 85% glycerol, preferably at least about 88% glycerol, about 0.5% salts, about 9% water, and other hydrocarbons based on the weight of the first stream 130.

Typically, the treatment zone 160 can include one or more ion exchange resin columns, adsorbers, electrolysis baths, evaporators, and/or fractionation columns to remove any heavy impurities and salts from the glycerol as a stream 168. Usually, the stream 168 may include one or more salts and/or heavy hydrocarbons. The treatment zone 160 can substantially separate liquid, such as water, methanol, and glycerol, from the dissolved salt. A treated glycerol stream 172 with the impurities removed can be provided to a reforming zone 180. In addition, the treatment zone 160 can provide an effluent or stream 176 including water and at least one alcohol, typically methanol. This stream 176 may optionally be provided to the reforming zone 180.

The reforming zone 180 can utilize any suitable reforming process to reform and/or gasify the treated glycerol stream 172 and form a gas rich in hydrogen. The reforming zone 180 can be a steam reforming zone, as disclosed in, e.g., US 2009/0287029 A1, which may provide hydrogen to the refining zone 300. Usually, a hydrocarbon and steam mixture is catalytically reacted at high temperature to form hydrogen and the carbon oxides, such as carbon monoxide and carbon dioxide. Because the reforming reaction is strongly endothermic, heat is generally supplied by a furnace to the reactant mixture.

One exemplary steam reforming process is autothermal reforming, also called catalytic partial oxidation, which may supply heat by the partial internal combustion of a feed with oxygen or air. Generally, exit temperatures may range from about 700-about 950° C. and pressures may be up to about 4,000 kPa.

In a reforming zone, lighter hydrocarbons and steam are catalytically reacted to form hydrogen and carbon oxides. The steam reforming product may be recycled to any of the reaction zones to provide at least hydrogen to the reaction zone. The hydrogen may be separated from the carbon oxides generated in the steam reforming reaction, and the separated hydrogen may be routed to the refining zone 300. Utilizing a derived feedstock from a renewable feed 20 for obtaining hydrogen can lower the carbon footprint of the biofuel production facility 10 by producing hydrogen from sources other than fossil fuel.

Alternatively, an aqueous phase reforming zone, as disclosed in, e.g., U.S. Pat. No. 6,964,758 B2, may be utilized. Typically, the reaction is conducted in a condensed liquid phase over a metal catalyst impregnated on a silica support. The reaction can be conducted at any suitable temperature and pressure.

The reforming zone 180 can provide an effluent stream 184 that may be provided to a separation zone 240. The separation zone 240 can include any suitable separation device, such as a pressure swing adsorption apparatus, such as those disclosed in, e.g., U.S. Pat. No. 7,399,341 B2. As such, the separation zone 240 may be a pressure swing adsorption zone. Generally, any suitable adsorbent, such as a zeolite, can be utilized, and the adsorption region may operate at a pressure of about 790-about 7,000 kPa and a temperature of about 0-about 80° C. The separation zone 240 can provide a byproduct stream 244 including fuel gas that may be optionally recycled to the reforming zone 180. The separation zone 240 can also provide a purified hydrogen stream 248, which may be substantially hydrogen and provided at least in part to the refining zone 300.

The second stream 140 including one or more fatty acids and the purified hydrogen stream 248 can be provided to the refining zone 300. Generally, the refining zone 300 can utilize any suitable hydrodeoxygenation, isomerization, and/or hydrocracking process. One exemplary refining zone 300 is disclosed in, e.g., US 2009/0287029 A1. In the refining zone 300, the second stream 140 can be contacted with a hydrogenation or hydrotreating catalyst in the presence of hydrogen at conditions to hydrogenate the unsaturated portions of the hydrocarbon chains. A hydrogenation or hydrotreating catalyst can include nickel, cobalt, nickel/molybdenum, cobalt/molybdenum, or one or more noble metals, such as platinum and/or palladium, dispersed on a high surface area support. Conditions may include a temperature of about 100-about 370° C. and a pressure of about 700-about 18,000 kPa.

Generally, the hydrogenation and hydrotreating catalysts can also decarboxylate, decarbonylate, and/or hydrodeoxygenate (collectively may be referred to as deoxygenation reactions) the second stream 140 to remove oxygen. Deoxygenation conditions may include a pressure of about 700-about 18,000 kPa, a temperature of about 200-about 460° C., and a liquid hourly space velocity of about 0.25-about 4 $hr^{-1}$.

The hydrogenation and deoxygenation reactions may occur in a single bed or separate beds operating under conditions to favor one or the other reaction. Optionally, an isomerization reaction may also occur, in the same or separate beds.

Generally, a combined or refined stream 452 from the refining zone 300 can include both a liquid portion and a gaseous portion. This refined stream 452 may be processed to provide gas and liquid portions. The gaseous portion may include hydrogen, carbon dioxide, carbon monoxide, water vapor, propane, nitrogen or nitrogen compounds, sulfur compounds, such as hydrogen sulfide, and phosphine. The liquid portion may include a hydrocarbon fraction having C15-C18 normal paraffins. Although this hydrocarbon fraction can be useful as a diesel fuel or diesel fuel blending component, additional fuels, such as jet fuels or jet fuel blending components that typically have a concentration of C9-C15 paraffins, may also be produced with additional processing.

Figure 2:
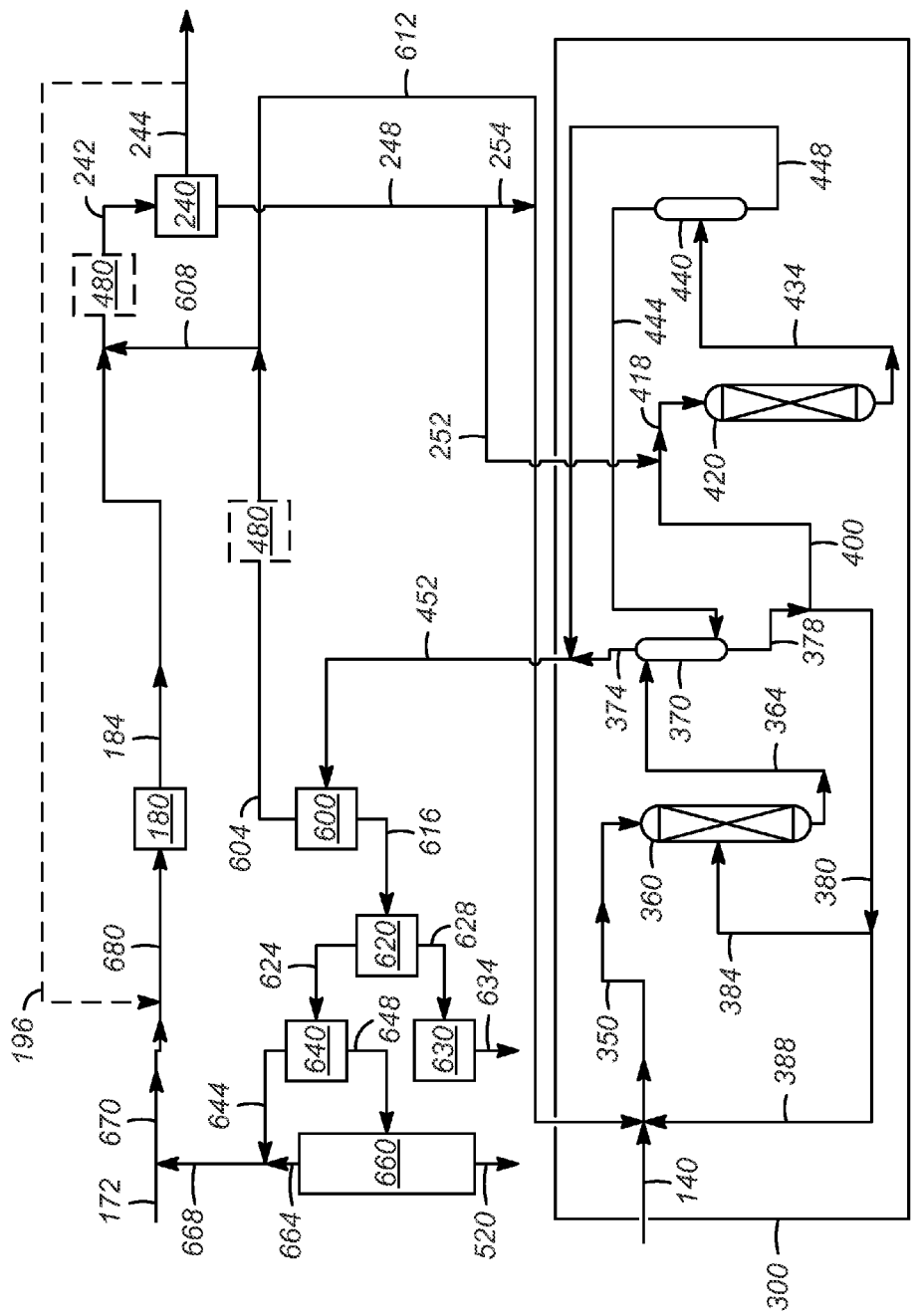
FIG. 2 is a schematic depiction of an exemplary reforming zone, separation zone, and refining zone along with other zones that may be utilized in another exemplary biofuel production facility.

Referring to FIG. 2, a portion of another exemplary biofuel production facility is depicted and may include the refining zone 300, the reforming zone 180, and the separation zone 240. In addition, other zones may be provided such as a scrubbing zone 480, a separation zone 600, a stripper zone 620, a dryer zone 630, a separation zone 640, and another separation zone 660. Other zones 120 and 160 may also be included, although these zones 120 and 160 are not depicted in FIG. 2.

In this exemplary embodiment, the refining zone 300 can include a hydrogenation zone 360, an isomerization zone 420, a first separator 370, and a second separator 440. Generally, the refining zone 300 receives the second stream 140 that optionally may receive a second part or stream 612, as hereinafter described, as well as a recycle stream 388, as hereinafter described. The streams 140, 388, and 612 may be combined to form a combined feed 350 that is provided to a hydrogenation zone 360. The combined feed 350 can be hydrogenated and/or deoxygenated in the hydrogenation zone 360 and provide an effluent 364. The hydrogenation zone 360 can be similar to those disclosed in, e.g., US 2009/0287029 A1.

The effluent 364 can be provided to the first separator 370 that can provide an overhead stream 374, which will be described in further detail hereinafter, and a bottom stream 378. In one exemplary embodiment, the first separator 370 can be a hot high pressure hydrogen stripper, as disclosed in, e.g., US 2009/0287029 A1, or a flash drum, to selectively separate at least a portion of the gaseous portion of the effluent from the liquid portion of the effluent. Any separated hydrogen can be combined with the refined stream 452, as discussed hereinafter. Any suitable pressure, such as a pressure of about 650-about 14,000 kPa, and any suitable temperature, such as a temperature of about 40-about 350° C., may be utilized.

The bottom stream 378 can be split into a recycle stream 380 and a feed 400. The recycle stream 380 can be at least partially recycled to the combined feed 350 as the stream 388 and/or as a recycle stream 384 to the hydrogenation zone 360. The other portion of the bottom stream 378 can be the feed 400 to the isomerization zone 420.

The isomerization zone 420 can receive the feed 400 optionally combined with a hydrogen stream 248, which will be described in further detail hereinafter, to provide a combined feed stream 418 to the isomerization zone 420. The isomerization zone 420 can be any suitable isomerization unit, including those disclosed in, e.g., US 2009/0287029 A1.

The isomerization zone 420 can include an isomerization catalyst for at least partially isomerizing any normal paraffins to isoparaffins. A suitable catalyst is disclosed in, e.g., US 2009/0287029 A1. The isomerization reaction may be carried out in the same reactor or different reactors in the presence of hydrogen at isomerization conditions to isomerize the normal paraffins to branched paraffins.

The isomerization of the paraffinic hydrocarbons can be accomplished using any suitable catalyst, such as a catalyst including a metal of Group VIII (IUPAC 8-10) of the Periodic Table and a support material. A suitable Group VIII metal can include platinum and palladium, each of which may be used alone or in combination. The support material may be amorphous or crystalline, such as an alumina, an amorphous alumina, an amorphous silica-alumina, a ferrierite, or a zeolite, which may be used alone or in combination. The isomerization catalyst may also include a modifier of lanthanum, cerium, praseodymium, neodymium, samarium, gadolinium, terbium, and a mixture thereof. Another suitable catalyst may be bifunctional and include an amorphous silica-alumina gel and one or more metals belonging to Group VIIIA (IUPAC 9), and may be effective in the hydroisomerization of long-chain normal paraffins containing more than 15 carbon atoms. Such catalysts and components, such as support materials, are disclosed in, e.g., US 2009/0287029 A1. Generally, the isomerization conditions can include a temperature of about 150-about 360° C. and a pressure of about 1,700-about 4,800 kPa.

Other reactions may occur, such as hydrocracking. Therefore, a second paraffinic hydrocarbon suitable for use as a jet fuel, or as a component for jet fuel may also be generated, although a main product can be a paraffinic hydrocarbon fraction suitable for use as diesel fuel or as a blending component for diesel fuel.

The isomerization zone 420 can provide an effluent 434 that can be provided to the second separator 440. Generally, the second separator 440 can be a stripper or a flash drum, operating at any suitable temperature and pressure. The second separator 440 can provide an overhead stream 444 and a bottom stream 448. The overhead stream 444 may be provided to the first separator 370, as described above. In addition, the bottom stream 448 can be combined with the overhead stream 374 to form a combined stream 452.

The combined stream 452 can pass to the separation zone 600. The separation zone 600 can be any suitable separation zone and include any suitable apparatus, such as a cold separator or one or more flash drums. The separation zone 600 can provide an overhead stream 604 and a bottom stream 616. The overhead stream 604 can optionally be directed to a scrubbing zone 480 and then be split into a first part 608 and a second part 612. Alternatively, the first part 608 and an effluent stream 184 can be combined as a stream 242 and can pass, optionally or additionally, through a scrubbing zone 480. Thus, the stream 604 and/or the stream 242 can pass through the scrubbing zone 480 or not.

The scrubbing zone 480 can be any suitable scrubbing zone, such as an amine scrubbing zone. An exemplary amine scrubbing zone is disclosed in, e.g., US 2009/0287029 A1. Generally, the streams 604 and 242 can include at least hydrogen, carbon monoxide, hydrogen sulfide, carbon dioxide and propane. The scrubbing zone 480 can include one or more amine absorbers to separate carbon dioxide and hydrogen sulfide from the streams 604 and 242. A suitable amine may be a promoted or an activated methyldiethanolamine. Conditions for the scrubbing zone 480 may include a temperature of about 30-about 60° C. and any suitable pressure. Typically, the carbon dioxide and hydrogen sulfide are absorbed by the amine while hydrogen rich recycle gas stream may be obtained.

The combined stream 242 can be provided to the separation zone 240, as hereinafter described. The second part 612, after receiving the stream 254 as hereinafter described, can be combined with the second stream 140, as described above.

The bottom stream 616 can be provided to the stripper zone 620. The stripper zone 620 may provide an overhead stream 624 and a bottom stream 628. Usually, the stream 628 is provided to a dryer zone 630, which can include any suitable dryer, such as a vacuum dryer. A biofuel stream 634 can be obtained, which in this exemplary embodiment may be a renewable diesel stream.

The overhead stream 624 can be provided to the separation zone 640 that can include any suitable device including a stripper receiver. The receiver can provide an overhead stream 644 and a bottom stream 648. The bottom stream 648 can be provided to the separation zone 660, which may be a distillation column. The separation zone 660 can provide a bottom stream 520, which can be a biofuel stream, such as a renewable naphtha or renewable diesel. Such a stream can have similar attributes as disclosed in, e.g., US 2009/0297029 A1.

The overhead stream 664 can be combined with the overhead stream 644 to form a combined stream 668 with a treated glycerol stream 172 from, e.g., the treatment zone 160 as depicted in FIG. 1. The combined stream 670 can be provided to the reforming zone 180. Optionally, a recycle stream 196 from the separation zone 240, as hereinafter described, can be combined with the stream 670 to provide a combined feed 680 to the reforming zone 180. If aqueous phase reforming is employed in the reforming zone 180, the recycle stream 196 may directed from a separator after the reforming zone 180. The reforming zone 180 can be similar as that described above. An effluent stream 184 including hydrogen and one or more $C4^-$ hydrocarbons from the reforming zone 180 can be provided. The effluent stream 184 may be combined with the first part 608 and optionally provided to a scrubbing zone 480, as described above. A stream 242 optionally issuing from the scrubbing zone 480 can act as a feed to the separation zone 240. The separation zone 240 can provide the purified hydrogen stream 248 and a byproduct stream 244, as described above. The hydrogen stream 248 can be provided to the refining zone 300. Particularly, the stream 248 can be split into streams 252 and 254 and provided, respectively, to the isomerization zone 420 and the hydrogenation zone 360.

The embodiments disclosed herein can allow the integration of process equipment to reduce energy requirements by allowing the transfer of heat. As an example, if an aqueous reforming reactor, which may operate at a low temperature, is utilized, the effluent from the hydrogenation zone 360 can heat both the feed to the isomerization zone 420 and the feed to the reforming zone 180. Moreover, a combined-service fired-heater can be installed to supply both the heat to an aqueous phase reforming reactor and the feed to the hydrogenation zone 360. In addition, a make-up gas compressor can be eliminated because the aqueous phase reforming reactor can operate at a sufficiently high pressure. What is more, the sections of the refining process and aqueous phase reforming process can be further integrated by combining the recycled gas stream with the gaseous aqueous phase reforming product upstream of purifying the hydrogen.

If a steam reformer is utilized, heat from a steam reforming process may be exported to the refining zone to minimize the number of duty fire heaters. In addition, one or more sponge adsorbers and other equipment from the refining zone flow can be eliminated by directing the $C4^-$ hydrocarbons and lighter compounds to steam reforming. This may supply up to about 45% of the hydrogen required for the refining zone 300. What is more, additional equipment required for separating gasoline from lighter products such as a debutanizer can be eliminated by directing naphtha and lighter material to the reforming zone that can supply about 75% of the hydrogen required for refining. Additionally, off gas from a cold separator may be directed to a pressure swing adsorber to eliminate an amine unit and improve catalytic performance.

If a scrubbing zone 480 is positioned to receive the stream 604 and the recycle gas does not pass through before a separation zone 240, a purge stream may be required to maintain the recycled gas purity. At a minimum, the purge stream can be redirected to the separation zone 240. It may be possible to direct the combined gaseous stream through a separation zone 240 eliminating the scrubbing zone 480. Hence, a scrubbing zone 480 including amine units may be optional. Including both the scrubbing zone 480 and the separation zone 240 may increase the purity and reduce the hydrogen sulfide and/or carbon monoxide concentration in the stream 248. The reduction of the carbon monoxide concentration in the stream 248 can be significant as carbon monoxide is known to hinder the performance of hydrogenation catalysts. With a higher purity recycled gas, it may be possible to decrease the gas circulation rate or decrease the inner pressure while maintaining the same hydrogen partial pressure within the reactors. These reductions can result in utility savings leading to a further reduction in the carbon footprint of the renewable fuels produced.

What is more, directing C4$^-$ byproducts to a reformer may eliminate other equipment, such as a sponge adsorber. If the sponge adsorber is eliminated, then a stripper receiver vapor and debutanizer overhead material can be directed to the reforming zone as a supplemental feed. If the sponge adsorber can be included in the design to maximize gasoline recovery or control the endpoint of the lean gas, then the lean gas from the sponge adsorber and the debutanizer overhead product can be directed to the reformer with a supplemental reformer feedstock.

In addition, the operation of the debutanizer can be modified to direct a portion of the light naphtha to the reformer with the debutanizer overhead. In this instance, the debutanizer operations can be shifted to recover one or more C5 hydrocarbons overhead to increase the hydrogen yield and minimize the supplemental feed stock required to supply the requisite hydrogen. This provides further flexibility in the unit, which can depend on which material to direct depending on availability and cost.

Other equipment can be incorporated in the unit, such as sponge adsorbers, to further eliminate impurities. However, the additional inclusion of the equipment can raise capital costs. Moreover, it is possible to incorporate the heat exported from a steam reformer to be used as heating for the feed to the refining zone and eliminate additional heaters.

Thus, the embodiments disclosed herein can provide a higher degree of integration and shared equipment to reduce capital and operating costs while minimizing the carbon usage in producing the biofuel. The integration of zones can provide about 45-about 75%, by mole, of the hydrogen required by the refining zone 300, and therefore, minimize the usage of hydrogen generated from fossil fuel sources.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for producing a biofuel while minimizing fossil fuel derived carbon dioxide emissions, comprising:
   A) providing a renewable feed to an ester degradation zone to produce a first stream comprising one or more alcohols and a second stream comprising one or more acids;
   B) providing the first stream to a treatment zone for removing one or more salts and to obtain a treated stream;
   C) providing the treated stream to a reforming zone to obtain an effluent comprising hydrogen; and
   D) providing the second stream and at least a portion of the effluent to a refining zone for producing the biofuel.

2. The process according to claim 1, wherein the renewable feed comprises one or more vegetable oils, animal oils, tallow, used cooking oils, essential oils, algal oils, and tall oils.

3. The process according to claim 1, wherein the renewable feed comprises one or more plant-derived oils.

4. The process according to claim 1, wherein the biofuel comprises a renewable diesel or a renewable jet fuel.

5. The process according to claim 1, wherein the one or more alcohols comprises glycerol.

6. The process according to claim 1, wherein the ester degradation zone comprises a hydrolysis zone.

7. The process according to claim 1, further comprising passing the effluent from the reforming zone to a pressure swing adsorption zone to provide a purified hydrogen stream.

8. The process according to claim 1, wherein the treatment zone further provides a stream comprising water and an alcohol.

9. The process according to claim 8, wherein the water and alcohol stream from the treatment zone is provided to the reforming zone.

10. The process according to claim 1, wherein the reforming zone comprises an aqueous phase reforming zone.

11. The process according to claim 1, wherein the reforming zone comprises a steam reforming zone.

12. The process according to claim 1, wherein the refining zone comprises a hydrodeoxygenation zone and an isomerization zone.

13. The process according to claim 1, wherein the treatment zone comprises at least one of one or more ion exchange resin columns, adsorbers, electrolysis baths, evaporators, and fractionation columns.

14. The process according to claim 1, wherein the one or more acids comprise one or more fatty acids.

* * * * *